(12) United States Patent
Braudaway

(10) Patent No.: US 6,571,021 B1
(45) Date of Patent: May 27, 2003

(54) RECOVERING AN INVISIBLE DIGITAL IMAGE FROM A DISTORTED IMAGE REPLICA

(75) Inventor: Gordon Wesley Braudaway, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/240,212

(22) Filed: Jan. 29, 1999

(51) Int. Cl.$^7$ .................................................. G06K 9/40
(52) U.S. Cl. ........................................ 382/275; 382/100
(58) Field of Search .............................. 382/275, 294, 382/268, 100, 232; 380/51, 54, 55

(56) References Cited

U.S. PATENT DOCUMENTS

| | | | | |
|---|---|---|---|---|
| 5,181,257 A | * | 1/1993 | Steiner et al. ............... | 382/162 |
| 5,251,271 A | | 10/1993 | Fling | |
| 5,825,892 A | * | 10/1998 | Braudaway et al. ........ | 382/100 |
| 6,108,434 A | * | 8/2000 | Cox et al. .................... | 382/100 |
| 6,282,329 B1 | * | 8/2001 | Ikeda .......................... | 382/309 |
| 6,400,826 B1 | * | 6/2002 | Chen et al. .................. | 382/100 |

* cited by examiner

Primary Examiner—Tommy D. Lee
(74) Attorney, Agent, or Firm—Louis P. Herzberg

(57) ABSTRACT

This invention provides methods and apparatus as a countermeasure to image distorting. Several image distorting algorithms have been developed that are intended to attack and obliterate robust relatively invisible image watermarks. These algorithms modify a watermarked image so subtly by geometric distortion that the modification is essentially unnoticeable to a human observer. However, their effect on imbedded relatively invisible watermarks can be devastating, often successfully rendering them unextractable. A method of the present invention involves detecting the presence of distortion in a presumed distorted image, then measuring the magnitude and type of distortion, and finally creating a reoriented image from which the measured distortion has been removed. Once image distortion is removed, conventional invisible watermark extraction methods can be employed to extract the watermark from the reoriented image.

43 Claims, 2 Drawing Sheets

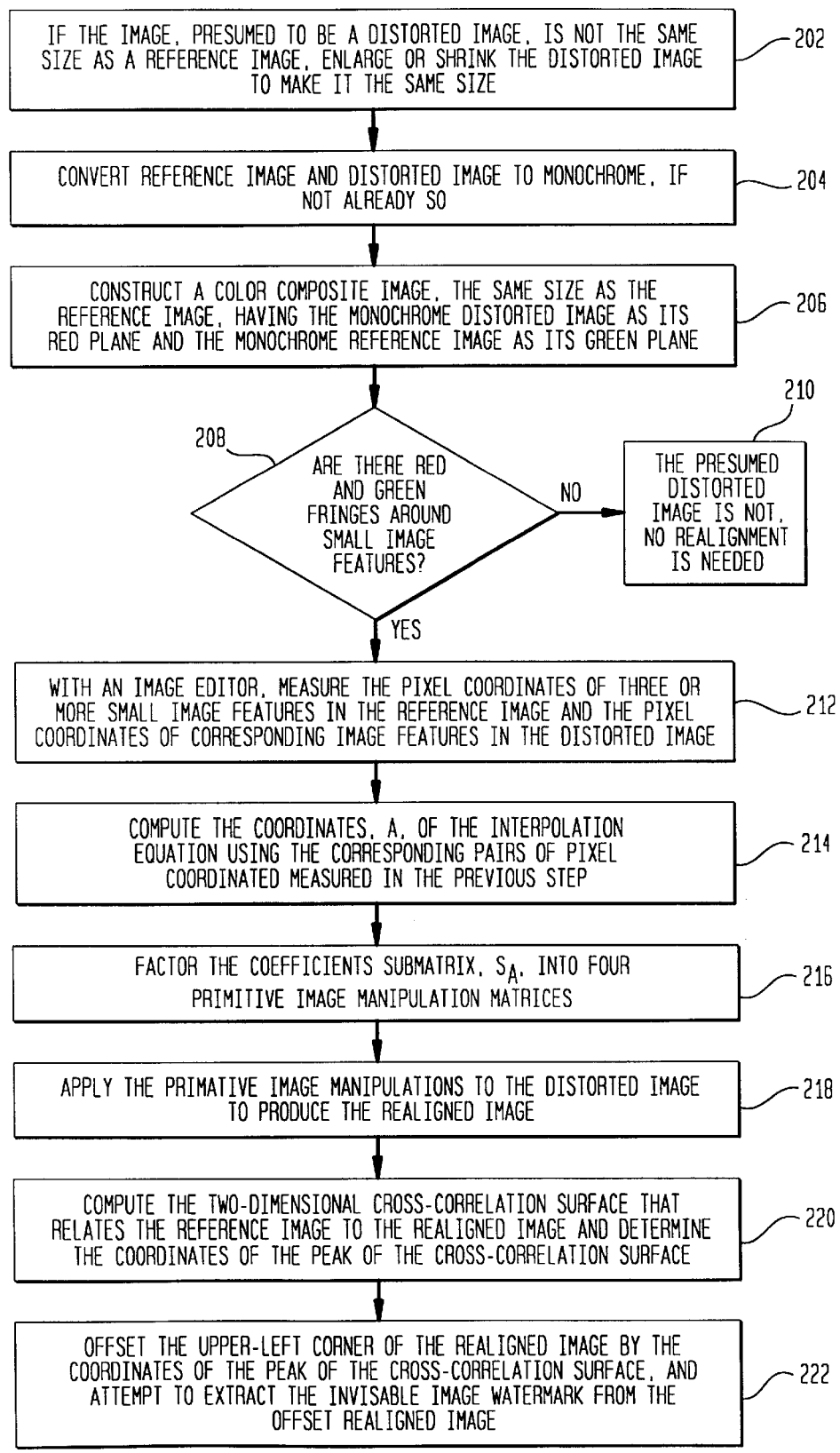

RECOVERING AN INVISIBLE DIGITAL IMAGE FROM A DISTORTED IMAGE REPLICA

CROSS REFERENCES

The present application is related to the following applications even dated herewith: Ser. No. 60/117,866, entitled, "COMPOSING A REALIGNED IMAGE," by inventors Gordon Braudaway et al.; and Ser. No. 60/117,921 entitled, "WATERMARKING AND DETERMINING DISTORTION IN AN IMAGE.", by inventors Gordon Braudaway et al., which are incorporated herein by reference in entirety.

FIELD OF THE INVENTION

This application relates to the field of digitized imaging. It is more specifically directed to recovery of an original image from a distorted image replica. It is particularly useful as a defense against negation of imbedded digital image watermarks.

BACKGROUND OF THE INVENTION

With the development of means of production and circulation of digital images, and the means of imbedding relatively invisible watermarks into digital images ostensibly to convey ownership of the image, there is now financial incentive to attempt to render an imbedded watermark undetectable. Pixel locations of a watermarked image are presumed to correspond to those in an unmarked original image. Generally, the watermark is imbedded by altering only the values of the pixel components of the original image, not their geometric positions. This may be accomplished employing such methods as described in U.S. Pat. No. 5,825,892 which is included herein by reference in its entirety.

Some methods of attacking an imbedded watermark rely on constructing a new image, called a distorted image, that is based on the watermarked image. Pixels in the distorted image are placed at subtly distorted positions relative to those in the watermarked image. Pixel component values in the distorted image are determined by two-dimensional interpolation of component values of enclosing pixel in the watermarked image. No constraints can be placed on the types of pixel position distortion an attacker might choose to use. To those skilled in the art, however, it is obvious that excessive pixel position-distortion will cause the distorted image to be a caricature of the watermarked image, thus diminishing or destroying its economic value. Whether a distortion is excessive is a subjective measure. For a distorted image to be useful it generally requires that whatever linear or nonlinear distortion methods that are used by an attack, have to be used sparingly, and in such a manner as to smoothly varying and relatively small position distortions. This is so as to be essentially unobjectionable and casually unnoticeable to untrained observers. The human visual system, as a qualitative measuring device, can be relied upon to readily detect excessive distortion. It is desirable to have a method of defense without limits on pixel position-distortions placed on the method of attack.

SUMMARY OF THE INVENTION

The present invention provides a method of defense against pixel-position distortion types of attacks. The method employs an undistorted reference image relative to which measurements of distortion are made. One aspect of the method employs, a determination of the existence of pixel position distortion; measurement of the amount of pixel position distortion of three or more image features in the distorted image relative to corresponding features in the reference image; based on these measurements, calculation of coefficients of a pixel relocating equation that can specify an approximate position distortion for every pixel in the distorted image. In some embodiments the method also includes a pixel repositioning technique that removes the measured distortion from the distorted image by forming a reoriented image. The reoriented image is, thus, approximately aligned with its corresponding reference image. Once realignment of the distorted image with the reference image is achieved, ordinary watermark extraction methods are used to extract the imbedded watermark from the reoriented image.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 2 shows a flow diagram of an example embodiment of steps taken to realign a presumed distorted image in accordance with the present invention.

DESCRIPTION OF THE INVENTION

Figure 1:
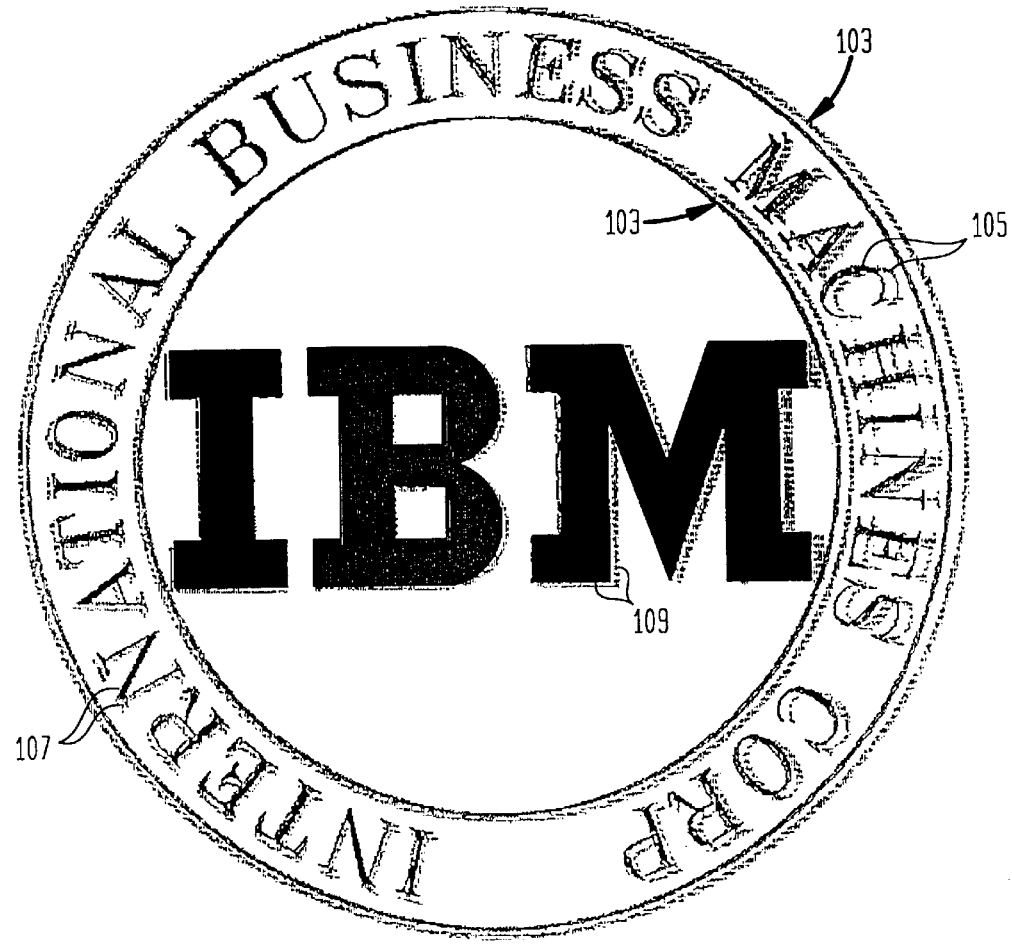
FIG. 1 shows a monochrome copy of a composite color image composed as described in accordance with the present invention.

The present invention provides a method of defense against pixel-position distortion types of attacks. The method employs an undistorted reference image relative to which measurements of distortion are made. For this purpose, either the original unmarked image or an invisibly watermarked copy of the original image, called a watermarked image, can serve equally well as the reference image.

The method includes first, a determination of the existence of pixel position distortion; second, measurement of the amount of pixel position distortion of three or more image features in the distorted image relative to corresponding features in the reference image; third, based on these measurements, calculation of coefficients of a pixel relocating equation that can specify an approximate position distortion for every pixel in the distorted image; and finally a pixel repositioning technique that can remove the measured distortion from the distorted image by forming a reoriented image. The reoriented image is, thus, approximately aligned with its corresponding reference image. Once realignment of the distorted image with the reference image is achieved, ordinary watermark extraction methods are used to extract the imbedded watermark from the reoriented image. In fact, extraction of an imbedded watermark from a reoriented image is advantageously used as a measure of the success of this defense method. Determination of the existence of pixel position distortion may employ the method described in the cross-referenced copending applications, and U.S. Pat. No. 5,825,892.

In an example semiautomatic embodiment, determination of the presence and measurement of the amount of pixel position distortion is accomplished as follows. First, if the presumed distorted image is not the same size as the reference image, it is made so by shrinking or enlarging the distorted image. Then if they are not already monochrome images, the reference image and distorted image are each reduced to separate monochrome images, called the monochrome reference image and the monochrome distorted image, respectively. A composite color image is constructed from the two monochrome images. The composite color image has the monochrome reference image as its green color plane and the monochrome distorted image as its red color plane. If the composite image contains only shades of yellow (the sum of red and green) with no visible red and green fringes around any of its features, the two images are correctly aligned and the presumption of distortion in the distorted image is not confirmed. Otherwise, if red and green fringes are evident, the two images are not aligned. This shows that the distorted image is in fact a distortion of the reference image. The amount of red and green fringes is an actual indication of the amount and type of distortion imparted on the reference image. Restoration of the distorted image is accomplished as described subsequently.

A monochrome copy of a composite color image composed as just described is shown in FIG. 1. The distorted image used was created by the "StirMark" algorithm and a monochrome copy of it is the red plane of the composite image. The green plane of the composite image is a monochrome copy of the reference image. (The reference image is a watermarked image used as input to the StirMark algorithm. It could also have been the unmarked original image instead.) Referring to FIG. 1, it can be seen that green and red fringes do exist. The light gray fringes (101) correspond to green and the darker gray fringes (103) correspond to red. The presence of fringes gives clear evidence that the distorted image is, in fact, distorted. By enlarging the composite image using an image editor (such as Adobe's Photoshop®), it is possible to record the horizontal and vertical coordinates of pixels closest to corresponding small features in the two images. Small features in this example might be the tips of serifs on the letters "C", (105), and "N", (107), the corner of the logotype letter "M", (109), and so on. The horizontal and vertical coordinates of a pixel closest to the n-th green (light gray) feature fringe will be referred to as $x_n$ and $y_n$, respectively, and the coordinates of a pixel closest to a corresponding red (dark gray) feature fringe will be referred to as $u_n$ and $v_n$.

It is advantageous to exercise due care in selecting the red and green pixel positions of each unaligned feature. If the surrounding background is darker than the feature, the red and green colors fringes have a true representation. However, if the surrounding background is brighter than the feature, the colors of the fringes are reversed, red for green and green for red.

General equations can now be written that relate the (EQUATION) coordinates of pixels featured in the reference image to the coordinates of corresponding pixels (EQUATION) in the distorted image. The equations are:

$$x_n = au_n + bv_n + c$$

$$y_n = du_n + ev_n + f$$

Rewriting the equations in vector-matrix form gives:

$$X = UA$$

where:

$$X = \begin{vmatrix} x_1 \\ y_1 \\ x_2 \\ y_2 \\ \ldots \\ x_n \\ y_n \end{vmatrix}, \quad U = \begin{vmatrix} u_1 & v_1 & 1 & 0 & 0 & 0 \\ 0 & 0 & 0 & u_1 & v_1 & 1 \\ u_2 & v_2 & 1 & 0 & 0 & 0 \\ 0 & 0 & 0 & u_2 & v_2 & 1 \\ \ldots & \ldots & \ldots & \ldots & \ldots & \ldots \\ u_n & v_n & 1 & 0 & 0 & 0 \\ 0 & 0 & 0 & u_n & v_n & 1 \end{vmatrix}, \quad A = \begin{vmatrix} a \\ b \\ c \\ d \\ e \\ f \end{vmatrix}$$

The coefficients of coefficient matrix, A, can be evaluated in a least-squares sense for any value of n that is greater than or equal to three, providing the n pixels chosen do not lie in a straight line, using the following equation:

$$A = [U^T U]^{-1} U^T X$$

where $U^T$ is the matrix transpose of U. Once the coefficients are solved for, the approximate undistorted pixel coordinates, x and y, for any values of the distorted pixel coordinates, u and v, are:

$$x = au + bv + c$$

$$y = du + ev + f$$

This pair of expressions is herein called the interpolation equations.

Realignment of the Distorted Image

Once the approximate undistorted pixel coordinates of every pixel in the distorted image can be computed, a reoriented image is constructed as follows. Given that the coordinates of pixels in the distorted image will be distinct integers, the undistorted pixel coordinates will usually not be distinct integers. One embodiment employs a means of determining pixel component values for the reoriented image by performing a two-dimensional interpolation using the pixel values from the distorted image that surround it. In an alternate embodiment used for the assumed small distortions, a simpler means can be used. The interpolation equations are rewritten in vector-matrix form as:

$$\begin{vmatrix} x \\ y \end{vmatrix} = \begin{vmatrix} a & b \\ d & e \end{vmatrix} \begin{vmatrix} u \\ v \end{vmatrix} + \begin{vmatrix} c \\ f \end{vmatrix}$$

Ignoring terms of second order, the matrix of four coefficients, called the coefficient submatrix, $S_A$, can be factored into the product of four primitive matrices, as below:

$$S_A = \begin{vmatrix} a & b \\ d & e + O(2) \end{vmatrix} = \begin{vmatrix} 1 & 0 \\ 0 & e \end{vmatrix} \begin{vmatrix} a & 0 \\ 0 & 1 \end{vmatrix} \begin{vmatrix} 1 & 0 \\ d/e & 1 \end{vmatrix} \begin{vmatrix} 1 & b/a \\ 0 & 1 \end{vmatrix}$$

These four primitive matrices, right to left, represent the primitive image manipulating operations of horizontal shearing, vertical shearing, horizontal scaling, and vertical scaling respectively. These four primitive operations, applied to the distorted image in the sequence specified, restore the distorted image geometrically to closely approximate the reference image. The restoration is herein called the reoriented image. To those skilled in the art, it is easily verifiable that the four primitive matrices can be rearranged into any of several different sequences that, if second order terms are ignored, will produce the same results.

In an embodiment, another operation is performed in restoring the distorted image to a very close approximation of the reference image. This operation is performed since in the process of restoring the distorted image, it is possible that pixels at the edges of the reoriented image will have been lost, and the center of the reoriented image may be horizontally and vertically offset from that of the reference image. This is predicted by non zero values of coefficients c and f in the interpolation equations. Rather than use those coefficients as the offset of the reoriented image relative to the reference image, the operation computes a two-dimensional discrete cross-correlation surface relating the reoriented image with the reference image. This is advantageously performed employing forward and reverse two-dimensional Discrete Fast Fourier Transforms (FFT's). In this case the interpolated horizontal and vertical offsets of the peak value in the cross-correlation surface relative to its origin are used instead of c and f. This is a somewhat more reliable means of finding the best offset values if the original distortions were nonlinear, since the method described above presupposes them to be linear. Those skilled in the art will recognize that for images distorted using linear distortions, it makes no difference which determination of the offsets is used.

An overview of the steps of realigning a presumed distorted image is shown in FIG. 2. First, if the presumed distorted image is not the same size as the reference image, it is shrunk or enlarged to make it the same size as the reference image by using standard image manipulating techniques available in a number of image editors, such as Adobe's Photoshop®, (202). Both the reference image and the distorted image are converted into monochrome images, if they are not already so, (204). A color composite image is then constructed having the monochrome reference image as its green plane and the monochrome distorted image as its red plane, (206). It is advantageous to make the blue plane of the composite image null. This is accomplished by setting the blue pixel value of every pixel to zero.

The composite image is then examined visually. If the composite image has no red and green fringes around any of its image features, (208), that is, if it is composed of pixels that are only of shades of yellow (the sum of red and green), then the presumption that the distorted image is, in fact, distorted is not true, and no image realignment is needed, (210). Otherwise, image realignment is needed.

If image realignment is needed, then, again using one of several available image editors, the pixel coordinates of at least three small features in the reference image and the coordinates of correspond small features in the distorted image are measured and recorded, (212). The three or more features chosen should not lie in a straight line. Using these measured pixel coordinates, the coefficients matrix, A, of the pixel position interpolation equations are computed, (214). A square submatrix, $S_A$, of four of the coefficients is factored into four primitive image manipulation matrices, (216). The distorted image is manipulated by the four primitive image manipulations to form the reoriented image, (218).

The two-dimensional cross-correlation surface relating the reoriented image and the reference image is computed using forward and reverse Discrete Fast Fourier Transforms (FFT's), and the greatest peak of the cross-correlation surface is located, (220). The coordinates of the peak value of the cross-correlation surface, relative to the origin of the cross-correlation surface, are used to represent the approximate offsets of the reoriented image relative to the reference image. The offsets are used as the offset of the upper-left corner of the reoriented image relative to the reference image. In some embodiments an attempt is made to extract the imbedded invisible watermark from the offset reoriented image, (222).

Thus the steps to implement an example embodiment of the present invention are as follows:

1. Resize distorted image if necessary: 202
If the image, presumed to be a distorted image, is not the same size as a reference image, enlarge or shrink the distorted image to make it the same size.

2. Convert images to monochrome: 204
Convert reference image and distorted image to monochrome, if not already so.

3. Construct color composite image: 206
Construct a color composite image, the same size as the reference image, having the monochrome distorted image as its red plane and the monochrome reference image as its green plane.

4. Determine if these are green and red fringes: 208
Are there red and green fringes around small image features?

5(a) If there are green and red fringes measure pixel of a small feature: 212
With an image editor, measure the pixel coordinates of three or more small image features in the reference image and the pixel coordinates of corresponding image features in the distorted image.

5(b) If not 210
The presumed distorted image is not; no realignment is needed.

6. Compute equation: 214
Compute the coordinates, A, of the interpolation equation using the corresponding pairs of pixel coordinated measured in the precious step.

7. Factor submatrix: 216
Factor the coefficients submatrix, (EQUATION), into four primitive image manipulation matrices.

8. Apply manipulations: 218
Apply the primitive image manipulations to the distorted image to produce the reoriented image.

9. Compute surface and determine peaks: 220
Compute the two-dimensional cross-correlation surface that relates the reference image to the reoriented image and determine the coordinates of the peak of the cross-correlation surface.

10. Extract watermark: 222
Offset the upper-left corner of the reoriented image by the coordinates of the peak of the cross-correlation surface, and attempt to extract the invisible image watermark from the offset reoriented image.

Although red and green images are used in the example embodiment, the method may be employed using any two distinct color planes.

The image restoration process detailed here has shown itself to be remarkably effective at restoring geometrically distorted images. The restoration process is general, in that it does not depend on any inside information concerning the types of distortion used by the attacker. In particular, using arguments from basic calculus, it is irrelevant whether linear or nonlinear methods are used for the distortion, as long as any nonlinear distortions are relatively small. The restoration method should, therefore, be applicable most particularly to those watermarking attacking methods that rely on subtle distortion of image pixel locations.

In a further embodiment, the entire restoration process is repeated iteratively, if necessary, by substituting the previously reoriented image for the distorted image before each subsequent iteration. For attacks with more nonlinear distortion, iteration is useful to further improve realignment of the distorted image.

It is noted that the relatively invisible watermarking method, in the referenced U.S. Pat. No. 5,825,892 has been demonstrated to imbed watermarks that survive and remain extractable after a watermarked image is printed and redigitized. It is generally not hard to find subtle, unintended distortions in the printing and redigitizing process that can damage an imbedded watermark. The restoration method described here can also be applied to printed and redigitized images in the same manner it has been applied to images distorted intentionally.

Thus, an aspect of the present invention provides a method for allowing a digital image watermark to be extracted from a geometrically distorted copy of a reference image. The method including: determining the type and amount of distortion; reversing the image to form an undistorted image; and aligning the undistorted image with the reference image.

In some embodiments the method further includes determining whether the distorted image has been geometrically distorted relative to an unmarked original image; and/or the steps of determining type and amount of distortion and reversing the distortion are repeated at least once; and/or the steps of determining the type and amount of distortion and reversing the distortion are repeatedly applied until an amount of the distortion falls below a given threshold; and/or the steps of determining the type and amount of distortion, reversing the distortion, and aligning the undistorted image are repeatedly at least once; and/or the steps of determining the type and amount of distortion, reversing the distortion, and aligning the undistorted image are repeatedly applied until an amount of the distortion falls below a given distortion threshold; and/or the step of determining includes measuring an amount of pixel positional distortion of three or more corresponding image features that do not lie in a straight line.

In some embodiments the step of determining the type and amount of distortion includes: selecting at least three reference points in the distorted image; determining the pixel position in the distorted image for each reference point; determining the pixel position in the reference image for each reference point; computing the positional offset for each reference point as the difference between the pixel position in the distorted image and the pixel position in the reference image; and calculating distortion parameters based on the positional offsets of the selected reference points.

In some embodiments of the method the step of determining the type and amount of distortion includes: reducing the reference image to a first monochrome image, reducing the distorted image to a second monochrome image; constructing a composite color image from the first and second monochrome images, using the first monochrome image as a first color plane and the second monochrome image as a second color plane, the first and second color planes having distinct colors from one another; and selecting at least three reference points in the distorted image, for each reference point: shifting one color plane with respect to the second color, visually determining at which shift the color planes align in regions around the selected point and accepting that shift as the positional offset, and calculating distortion parameters based on the positional offsets of the selected reference points.

In some cases the step of determining the type and amount of distortion calculates the amount of vertical scaling, horizontal scaling, vertical shearing and horizontal shearing that must be applied to the distorted image to remove the distortion; and the step of reversing the image to form an undistorted image includes vertical scaling, horizontal scaling, vertical shearing and horizontal shearing operations.

In some embodiments the step of determining the type and amount of geometric distortion calculates the amount of vertical scaling, horizontal scaling, rotation that must be applied to the distorted image to remove the distortion, and the step of reversing the image to form an undistorted image includes vertical scaling, horizontal scaling, and rotation operations.

In some embodiments the step of determining the type and amount geometric distortion calculates the amount of vertical scaling, horizontal scaling, and rotation that must be applied to the distorted image to remove the distortion, the step of reversing the image to form an undistorted image includes vertical scaling, horizontal scaling and rotation operations; and/or the step of determining the type and amount of geometric distortion calculates the amount of vertical scaling, horizontal scaling, horizontal shear and vertical shear that must be applied to the distorted image to remove the distortion, the step of reversing the image to form an undistorted image includes vertical scaling, horizontal scaling, horizontal shear, and vertical shear operations.

In some embodiments the method further includes determining whether the reference image has been geometrically distorted relative to the reference image.

In some embodiments the step of determining includes: reducing the reference image to a monochrome image and the distorted image to a monochrome image; constructing a composite color image from the two monochrome images, using one monochrome image as one color plane and the other monochrome image as a second color plane; and determining whether the composite image contains shades of constant chrominance.

In some embodiments the composite color image includes one monochrome image as the red color plane, the other monochrome image as the green color plane, and the shades of constant chrominance are shades of yellow.

In some embodiments the step of determining the type and amount of distortion is performed semi-automatically or automatically.

In some embodiments of the method the step of measuring an amount of pixel distortion is accomplished by: selecting a set of three or more points in the reference image; correlating a region in the distorted image, surrounding each point, with regions in the reference image; determining the correlation peak and accepting that as a positional distortion of the set of points; and determining the geometric distortion from the positional distortion of the set of points; and/or the step of determining is accomplished by: selecting a set of three or more points in the reference image; correlating a region in the reference image, surrounding each point, with regions in the distorted image; determining the correlation peak and accepting that as a positional distortion of the selected point; and determining the geometric distortion from the positional distortion of the set of points.

Another aspect of the invention is to provide a method including: measuring the degree and type of distortion imparted upon a distorted replica of an original image; reversing the distortion of the distorted replica to form an undistorted image; and aligning the undistorted image with the original image.

In some embodiments the method also includes determining whether the distorted replica image has been geometrically distorted relative to an unmarked form of the original image.

In some embodiments of the method the step of measuring includes: measuring an amount of pixel positional distortion of three or more corresponding image features that do not lie in a straight line; and/or the step of reversing includes: computing a two-dimensional cross-correlation surface relating a reoriented form of the image and the reference image, using forward and reverse Discrete Fast Fourier Transforms (FFT's), and locating a greatest peak of the cross-correlation surface, using the coordinates of the peak, relative to the origin of the cross-correlation surface to represent approximate offsets of the reoriented image relative to the reference image; and/or the method includes using the offsets as the offset of an upper-left corner of the reoriented image relative to the reference image; and/or extracting an imbedded invisible watermark from the offset reoriented image.

In some embodiments the step of determining includes: reducing the original image and the distorted image to a separate monochrome image, constructing a composite color image from the two separate monochrome images, placing the monochrome original image in a first color plane of the composite image, and placing the monochrome distorted image in a second color plane of the composite image, where the first and second color planes represent colors that are distinct from one another, and determining if the composite image contains only shades of the sum of the colors of the first and second color planes, with no fringes having a color of the first and/or second color planes, and if fringes having a color of the first and/or second color planes are evident, the two images are not aligned.

In some embodiments the method includes determining that if no fringes have a color of the first and/or second color planes, the two separate images are correctly aligned and no detectable distortion exists in the distorted image; and/or further includes calculating coefficients of a pixel relocating equation that specifies an approximate measure of positional distortion for every pixel in the distorted image; and/or employing a watermark detection method to detect an imbedded watermark from the undistorted image; and/or the step of employing includes an invisible watermark detection method.

Another aspect of the invention provides an article of manufacture comprising a computer usable medium having computer readable program code means embodied therein for causing a digital image watermark to be extracted from a geometrically distorted copy of a reference image, the computer readable program code means in said article of manufacture comprising computer readable program code means for causing a computer to effect the steps of a method described above.

Still another aspect of the invention provides a computer program product comprising a computer usable medium having computer readable program code means embodied therein for causing a realignment of a undistorted image, the computer readable program code means in said computer program product comprising computer readable program code means for causing a computer to effect any of the methods described above.

It is noted that although the description of the invention is made for particular arrangements of steps, the intent and concept of the present invention are suitable and applicable to other arrangements. It will be clear to those skilled in the art that other modifications to the disclosed embodiments can be effected without departing from the spirit and scope of the invention.

What is claimed is:

1. A method for allowing a digital image watermark to be extracted from a geometrically distorted copy of a reference image, the method comprising:

determining the type and amount of distortion in said distorted copy;

reversing the distortion in said distorted copy of the image to form an undistorted image; and aligning the undistorted image with the reference image.

2. A method as recited in claim 1, further comprising determining whether the distorted image has been geometrically distorted relative to an unmarked original image.

3. A method as recited in claim 1, wherein the steps of determining type and amount of distortion and reversing the distortion are repeated at least once.

4. A method as recited in claim 3, wherein the steps of determining the type and amount of distortion and reversing the distortion are repeatedly applied until an amount of the distortion falls below a given threshold.

5. A method as recited in claim 1, wherein the steps of determining the type and amount of distortion, reversing the distortion, and aligning the undistorted image are repeatedly at least once.

6. A method as recited in claim 1, wherein the steps of determining the type and amount of distortion, reversing the distortion, and aligning the undistorted image are repeatedly applied until an amount of the distortion falls below a given distortion threshold.

7. A method as recited in claim 1, wherein the step of determining includes:

measuring an amount of pixel positional distortion of three or more corresponding image features that do not lie in a straight line.

8. A method as recited in claim 7, wherein the step of measuring an amount of pixel distortion is accomplished by:

selecting a set of three or more points in the reference image;

correlating a region in the distorted image, surrounding each point, with regions in the reference image;

determining the correlation peak and accepting that as a positional distortion of the set of points; and determining the geometric distortion from the positional distortion of the set of points.

9. A method as recited in claim 1, wherein the step of determining the type and amount of distortion includes:

selecting at least three reference points in the distorted image;

determining the pixel position in the distorted image for each reference point;

determining the pixel position in the reference image for each reference point;

computing the positional offset for each reference point as the difference between the pixel position in the distorted image and the pixel position in the reference image; and calculating distortion parameters based on the positional offsets of the selected reference points.

10. A method as recited in claim 9, wherein:

the step of determining the type and amount of distortion calculates the amount of vertical scaling, horizontal scaling, vertical shearing and horizontal shearing that must be applied to the distorted image to remove the distortion; and the step of reversing the image to form an undistorted image includes vertical scaling, horizontal scaling, vertical shearing and horizontal shearing operations.

11. A method as recited in claim 9, wherein the step of determining the type and amount of geometric distortion calculates the amount of vertical scaling, horizontal scaling, rotation that must be applied to the distorted image to remove the distortion, and the step of reversing the image to form an undistorted image includes vertical scaling, horizontal scaling, and rotation operations.

12. A method as recited in claim 1, wherein the step of determining the type and amount of distortion includes:

reducing the reference image to a first monochrome image, reducing the distorted image to a second monochrome image:

constructing a composite color image from the first and second monochrome images, using the first monochrome image as a first color plane and the second monochrome image as a second color plane, the first and second color planes having distinct colors from one another; and selecting at least three reference points in the distorted image, for each reference point:

shifting one color plane with respect to the second color, visually determining at which shift the color planes align in regions around the selected point and accepting that shift as the positional offset, and calculating distortion parameters based on the positional offsets of the selected reference points.

13. A method as recited in claim 12, wherein the step of determining the type and amount geometric distortion calculates the amount of vertical scaling, horizontal scaling, and rotation that must be applied to the distorted image to remove the distortion.

the step of reversing the image to form an undistorted image includes vertical scaling, horizontal scaling and rotation operations.

14. A method as recited in claim 12, wherein the step of determining the type and amount of geometric distortion calculates the amount of vertical scaling, horizontal scaling, horizontal shear and vertical shear that must be applied to the distorted image to remove the distortion, and the step of reversing the image to form an undistorted image includes vertical scaling, horizontal scaling, horizontal shear, and vertical shear operations.

15. A method as recited in claim 12, where the composite color image includes one monochrome image as the red color plane, the other monochrome image as the green color plane, and the shades of constant chrominance are shades of yellow.

16. A method as recited in claim 1, further comprising determining whether the reference image has been geometrically distorted relative to the reference image.

17. A method as recited in claim 1, wherein the step of determining includes:

reducing the reference image to a monochrome image and the distorted image to a monochrome image:

constructing a composite color image from the two monochrome images, using one monochrome image as one color plane and the other monochrome image as a second color plane; and determining whether the composite image contains shades of constant chrominance.

18. A method as recited in claim 1, wherein the step of determining the type and amount of distortion is performed automatically.

19. A method as recited in claim 1, wherein the step of determining is accomplished by:

selecting a set of three or more points in the reference image;

correlating a region in the reference image, surrounding each point, with regions in the distorted image;

determining the correlation peak and accepting that as a positional distortion of the selected point; and determining the geometric distortion from the positional distortion of the set of points.

20. A computer program product comprising a computer usable medium having computer readable program code means embodied therein for causing a realignment of a undistorted image, the computer readable program code means in said computer program product comprising computer readable program code means for causing a computer to effect:

measuring the degree and type of geometric distortion imparted upon a distorted replica of an original image;

reversing the geometric distortion of the distorted replica to form an undistorted image; and aligning the undistorted image with the original image.

21. A computer program product as recited in claim 20, the computer readable program code means in said computer program product further comprising further comprising determining whether the distorted replica image has been geometrically distorted relative to an unmarked form of the original image.

22. A computer program product as recited in claim 20, wherein the steps of determining type and amount of distortion and reversing the geometric distortion are repeated at least once.

23. A method comprising:

measuring the degree and type of geometric distortion imparted upon a distorted replica of an original image;

reversing the geometric distortion of the distorted replica to form an undistorted image; and aligning the undistorted image with the original image.

24. A method as recited in claim 23, further comprising determining whether the distorted replica image has been geometrically distorted relative to an unmarked form of the original image.

25. A method as recited in claim 24, wherein the step of determining includes:

reducing the original image and the distorted image to a separate monochrome image;

constructing a composite color image from the two separate monochrome images;

placing the monochrome original image in a first color plane of the composite image, and placing the monochrome distorted image in a second color plane of the composite image, where the first and second color planes represent colors that are distinct from one another; and determining if the composite image contains only shades of the sum of the colors of the first and second color planes, with no fringes having a color of the first and/or second color planes; and if fringes having a color of the first and/or second color planes are evident, the two images are not aligned.

26. A method as recited in claim 24, wherein the first color plane is a red color plane, the second color plane is a green color plane, and the shades of the sum are yellow.

27. A method as recited in claim 24, further comprising determining that if no fringes have a color of the first and/or second color planes, the two separate images are correctly aligned and no detectable distortion exists in the distorted image.

28. A method as recited in claim 24, further comprising employing a watermark detection method to detect an imbedded watermark from the undistorted image.

29. A method as recited in claim 28, wherein the step of employing includes an invisible watermark detection method.

30. A method as recited in claim 23, wherein the step of measuring includes:
   measuring an amount of pixel positional geometric distortion of three more corresponding image features that do not lie in a straight line.

31. A method as recited in claim 23, wherein the step of reversing includes:
   computing a two-dimensional cross-correlation surface relating a reoriented form of the image and the reference image, using forward and reverse Discrete Fast Fourier Transforms (FFT's), and locating a greatest peak of the cross-correlation surface;
   using the coordinates of the greatest peak, relative to the origin of the cross-correlation surface to represent approximate offsets of the reoriented image relative to the reference image.

32. A method as recited in claim 31, further comprising using the offsets as the offset of an upper-left corner of the reoriented image relative to the reference image.

33. A method as recited in claim 31, further comprising extracting an imbedded invisible watermark from the offset reoriented image.

34. A method as recited in claim 23, further comprising calculating coefficients of a pixel relocating equation that specifies an approximate measure of positional distortion for every pixel in the distorted image.

35. A method as recited in claim 23, further comprising resizing the geometrically distorted image to a same size as the original image.

36. A method as recited in claim 38, wherein the step of measuring is performed quantitatively and qualitatively.

37. A method as recited in claim 23, wherein the step of aligning includes a pixel repositioning technique that removes the measured geometric distortion from the distorted image by forming a reoriented image.

38. An article of manufacture comprising a computer usable medium having computer readable program code means embodied therein for causing a digital image watermark to be extracted from a geometrically distorted copy of a reference image, the computer readable program code means in said article of manufacture comprising computer readable program code means for causing a computer to effect:
   determining the type and amount of distortion;
   reversing the image to form an undistorted image; and
   aligning the undistorted image with the reference image.

39. An article of manufacture as recited in claim 38, the computer readable program code means in said article of manufacture further comprising computer readable program code means for causing a computer to effect determining whether the distorted image has been geometrically distorted relative to an unmarked original image.

40. An article of manufacture as recited in claim 38, wherein the steps of determining type and amount of distortion and reversing the distortion are repeated at least once.

41. An article of manufacture as recited in claim 38, wherein the step of determining the type and amount of distortion includes:
   selecting at least three reference points in the distorted image;
   determining the pixel position in the distorted image for each reference point;
   determining the pixel position in the reference image for each reference point;
   computing the positional offset for each reference point as the difference between the pixel position in the distorted image and the pixel position in the reference image; and
   calculating distortion parameters based on the positional offsets of the selected reference points.

42. An article of manufacture as recited in claim 38, wherein the step of determining the type and amount of distortion includes:
   reducing the reference image to a first monochrome image,
   reducing the distorted image to a second monochrome image:
      constructing a composite color image from the first and second monochrome images, using the first monochrome image as a first color plane and the second monochrome image as a second color plane, the first and second color planes having distinct colors from one another; and
   selecting at least three reference points in the distorted image,
   for each reference point:
      shifting one color plane with respect to the second color,
      visually determining at which shift the color planes align in regions around the selected point and accepting that shift as the positional offset, and
      calculating distortion parameters based on the positional offsets of the selected reference points.

43. An article of manufacture as recited in claim 38, wherein:
   the step of determining the type and amount of distortion calculates the amount of vertical scaling, horizontal scaling, vertical shearing and horizontal shearing that must be applied to the distorted image to remove the distortion; and
   the step of reversing the image to form an undistorted image includes vertical scaling, horizontal scaling, vertical shearing and horizontal shearing operations.

* * * * *